United States Patent [19]
Murphy et al.

[11] Patent Number: 5,764,947
[45] Date of Patent: Jun. 9, 1998

[54] SYSTEM AND METHOD FOR AUTOMATICALLY INTERFACING CALL CONVENTIONS BETWEEN TWO DISSIMILAR PROGRAM UNITS

[75] Inventors: Daniel L. Murphy; William B. Noyce, both of Hollis, N.H.

[73] Assignee: Digital Equipment Corporation, Maynard, Mass.

[21] Appl. No.: 204,694

[22] Filed: Mar. 2, 1994

Related U.S. Application Data

[63] Continuation of Ser. No. 666,028, Mar. 7, 1991, abandoned.
[51] Int. Cl.$^6$ ................................................ G06F 9/00
[52] U.S. Cl. .............. 395/500; 364/239.9; 364/242.96; 364/280.4; 364/284; 364/DIG. 1
[58] Field of Search ...................... 395/500, 700

[56] References Cited

U.S. PATENT DOCUMENTS

| | | | |
|---|---|---|---|
| 4,297,743 | 10/1981 | Appell et al. | 395/700 |
| 5,097,533 | 3/1992 | Buyer et al. | 395/500 |
| 5,142,622 | 8/1992 | Owens | 395/200 |
| 5,146,593 | 9/1992 | Brandle et al. | 395/700 |
| 5,179,703 | 1/1993 | Evans | 395/700 |
| 5,315,710 | 5/1994 | Kishimoto et al. | 395/700 |

FOREIGN PATENT DOCUMENTS 0387172  9/1990  European Pat. Off. .

OTHER PUBLICATIONS

J. D. Argo et al. "Making System Serv. Inter. Stand. Across Diff OS Systems", IBM Tech. Disc. Bull., p. 3197, No. 10, Mar. 1973.

Roger Hayes et al. "Facilitating Mixed Lang. Prog. in Dist. Syst." IEEE Trans. on Soft. Eng. vol. SE-13 No. 12, Dec. 1987, pp. 1254-1264.

*Primary Examiner*—Kevin J. Teska
*Assistant Examiner*—Ayni Mohamed
*Attorney, Agent, or Firm*—Anne E. Saturnelli

[57] ABSTRACT

A jacketing system automatically interfaces dissimilar program units during program execution on a computer system. Means are provided for detecting a call for execution of a second program unit having a second call standard form a first program unit having a first call standard during execution of the first program unit on the computer system. A procedure descriptor is used in the code for the first program unit and it includes a signature that defines the call standard for each incoming call to the first program unit. A bound procedure descriptor is also used in the code for each outgoing call from the first program unit and it includes a signature that defines the call standard for the target program unit. Jacketing routines are driven by the descriptors in jacketing calls between the two program units.

28 Claims, 9 Drawing Sheets

SYSTEM AND METHOD FOR AUTOMATICALLY INTERFACING CALL CONVENTIONS BETWEEN TWO DISSIMILAR PROGRAM UNITS

This application is a continuation of application Ser. No. 07/666,028, filed Mar. 7, 1991 and now abandoned.

Reference is also made to the following concurrently filed patent applications assigned to the present assignee and related code translation:

Ser. No. 07/666,070, now U.S. Pat. No. 5,428,786 entitled BRANCH RESOLUTION VIA BACKWARD SYMBOLIC EXECUTION and filed by Richard L. Sites.

Ser. No. 07/666,216, U.S. Pat. No. 5,287,490 entitled LOCATING PROGRAM CODE BY SUCCESSIVE CODE EXECUTION AND INTERPRETATION and filed by Richard L. Sites.

Ser. No. 07/666,210, U.S. Pat. No. 5,450,575 entitled USE OF STACK DEPTH TO IDENTIFY MACHINE CODE MISTAKES and filed by Richard L. Sites.

Ser. No. 07/666,223, U.S. Pat. No. 5,317,740 entitled CROSS-IMAGE REFERENCING OF PROGRAM CODE and filed by Richard L. Sites.

Ser. No. 07/666,083, U.S. Pat. No. 5,301,325 entitled USE OF STACK DEPTH TO IDENTIFY ARCHITECTURE AND CALLING STANDARD DEPENDENCIES IN MACHINE CODE and filed by Thomas R. Benson.

Ser. No. 07/666,084, U.S. Pat. No. 5,339,238 entitled REGISTER USAGE TRACKING TO SUPPORT COMPILED 32-BIT CODE IN 64-BIT ENVIRONMENT and filed by Thomas R. Benson.

Ser. No. 07/666,085, U.S. Pat. No. 5,307,492 entitled MAPPING ASSEMBLY LANGUAGE ARGUMENT LIST REFERENCES ACROSS MACHINE ARCHITECTURES and filed by Thomas R. Benson.

Ser. No. 07/666,082, U.S. Pat. No. 5,598,560 entitled TRACKING VAX® CONDITION CODES FOR PORTING TO RISC ARCHITECTURE and filed by Thomas R. Benson.

Ser. No. 07/666,023, U.S. Pat. No. 5,297,291 entitled EFFICIENT AND FLEXIBLE LINK OF PROGRAM UNITS AT PROGRAM ACTIVATION and filed by Daniel L. Murphy.

CROSS REFERENCE TO RELATED APPLICATIONS

Reference is made to the following concurrently filed patent applications assigned to the present assignee and hereby incorporated by reference:

Ser. No. 07/666,039, now abandoned entitled IMPROVED SYSTEM AND METHOD FOR EXECUTING MULTIPLE CODES IN A MULTI-ARCHITECTURE ENVIRONMENT WITH CODE DEBUGGING CAPABILITY and filed by Mark A. Herdeg, James A. Wooldridge, Scott G. Robinson, Ronald F. Brender and Michael V. Iles.

Ser. No. 07/665,888, now abandoned entitled IMPROVED SOFTWARE DEBUGGING SYSTEM AND METHOD ESPECIALLY ADAPTED FOR CODE DEBUGGING WITHIN A MULTI-ARCHITECTURE ENVIRONMENT and filed by James A. Wooldridge, Ronald F. Brender and Henry N. Grieb, III.

Ser. No. 07/666,022, now abandoned entitled IMPROVED SIMULATOR SYSTEM AND METHOD ESPECIALLY ADAPTED FOR CODE EXECUTION IN A MULTI-CODE EXECUTION AND DEBUGGING SYSTEM WITHIN A MULTI-ARCHITECTURE ENVIRONMENT and filed by Mark A. Herdeg and Michael V. Iles.

Ser. No. 07/666,072, now abandoned entitled IMPROVED SYSTEM AND METHOD FOR DETECTING CROSS-DOMAIN INSTRUCTION CALLS AND DATA REFERENCES ESPECIALLY ADAPTED FOR CODE INTERFACE JACKETING IN A MULTI-CODE EXECUTION AND DEBUGGING SYSTEM WITHIN A MULTI-ARCHITECTURE ENVIRONMENT and filed by Mark A. Herdeg, Scott G. Robinson, Ronald F. Brender and Michael V. Iles.

Ser. No. 07/665,752, U.S. Pat. No. 5,339,422 entitled IMPROVED SYSTEM AND METHOD FOR JACKETING CROSS-DOMAIN CALLS IN A MULTI-CODE EXECUTION AND DEBUGGING SYSTEM WITHIN A MULTI-ARCHITECTURE ENVIRONMENT and filed by Ronald F. Brender and Michael V. Iles.

Ser. No. 07/665,886, now abandoned which is entitled FASTER PROCESS FOR DEVELOPING NEW COMPUTER SYSTEMS EMPLOYING NEW AND BETTER PROCEDURES FOR SOFTWARE DEVELOPMENT AND TESTING and filed by Robert V. Landau, James E. Johnson and Michael V. Iles.

Reference is also made to the following concurrently filed patent applications assigned to the present assignee:

Ser. No. 07/666,071, now abandoned entitled IMPROVED SYSTEM AND METHOD FOR PRESERVING INSTRUCTION STATE-ATOMICITY FOR TRANSLATED PROGRAM CODE and filed by Scott G. Robinson, Richard Sites and Richard Witek.

Ser. No. 07/700,770 now U.S. Pat. No. 5,432,795 which is hereby incorporated by reference and which is entitled IMPROVED SYSTEM AND METHOD FOR PRESERVING INSTRUCTION GRANULARITY FOR TRANSLATED PROGRAM CODE and filed by Scott G. Robinson and Richard Sites.

BACKGROUND OF THE INVENTION

The present invention relates to systems and methods for interfacing interdependent, dissimilar program units for execution by a computer processor, and more particularly to structure and procedures for automatically interfacing call conventions between dissimilar program units during program execution.

There are various circumstances under which interdependent, dissimilar program units employing different calling standards are to be executed on a computer system and accordingly need to be interfaced for proper operation. Calling standard differences may exist in semantics and/or in mechanics.

For example, a new computer system having a new architecture may be developed for which it is desirable to employ program units that are translated from program units developed for a predecessor computer system having an old architecture.

Accordingly, program units written in native code for the new computer and program units in translated code will have calling standard differences that must be interfaced for interdependent program unit operation.

The referenced applications pertain to a new code translation system employed to adapt an existing program library for an existing computer for use on a new computer having a different architecture. The translation system has general application to program unit migration between computer systems having different architectures, such as between the complex-instruction-set VAX® computer system and a RISC computer system manufactured by the present assignee.

3

Among other possibilities, another case in which differences in program unit calling standards will require interfacing is where the program units are designed for different length memory environments, such as 64-bit and 32-bit environments.

To provide an interface between dissimilar program units, the calling program unit must be made to appear to follow the calling conventions expected by the callee. Conversely, the program unit being called ("callee") must be made to appear to follow the calling conventions of the caller. The arguments and return values of a particular caller may thus be adapted to the requirements of a particular callee, and the adaptation process is referred to as jacketing.

It is especially desirable that jacketing be provided so that it is automatically completed at run-time without explicit action by the designer or builder of images. In this manner, program units can be replaced by subsequent versions without requiring relinking and reactivation of the entire system. The present invention is directed to a system that employs automatic jacketing to interface dissimilar program units during execution.

SUMMARY OF THE INVENTION

A jacketing system automatically interfaces dissimilar program units during program execution on a computer system. Means are provided for detecting a call for execution of a second program unit having a second call standard from a first program unit having a first call standard during executing of the first program unit on the computer system.

A call connection is made if the calling standards of the first and second program units are detected to match. If no match is detected, a representation of parameters to be passed from the first to the second program unit is converted to another representation that uses the call standard of the second program unit.

BRIEF DESCRIPTION OF THE DRAWINGS

The accompanying drawings, which are incorporated in and constitute a part of this specification illustrate one embodiment of the invention and together with the description provide an explanation of the objects, advantages and principles of the invention. In the drawings.

DESCRIPTION OF THE PREFERRED EMBODIMENT

Figure 1A:
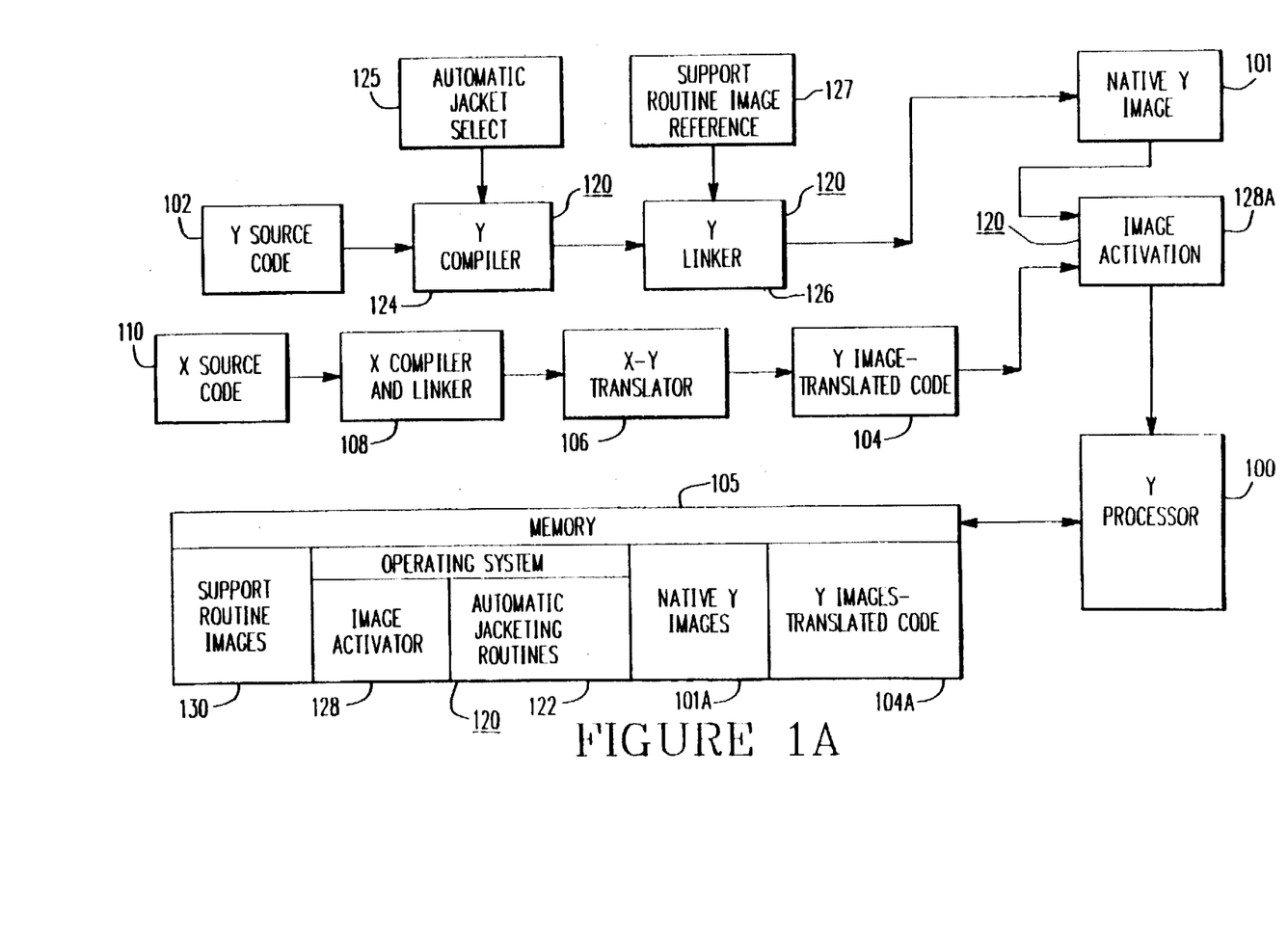
FIG. 1A shows a functional block diagram in which procedures and system structure are arranged to provide automatic jacketing between dissimilar program units in accordance with the present invention.

There is shown in FIG. 1A a Y processor 100 which executes program units generated in Y code 101 from Y source code 102. In addition, program units, dissimilar from the program units in the Y code 101, are generated in Y code 104 from source code 110 by an X-Y translator 106 and are executed by the Y processor 100. The same or different languages may be employed for the source codes 102 and 110.

The X-Y translator 106 produces the translated code 104 from compiled and linked X code 108 generated from X source code 110. For example, the X and Y codes may be the VAX® and RISC codes, respectively, produced for execution on the VAX® computer system and a RISC computer system, respectively, made by the present assignee.

For calls between translated images, the translator 106 handles all required call mechanics. For calls between native Y images, the mechanics are specified by the Y call standard. Calls between native or Y images and translated or X images, however, typically involve non-matching specifications for the setup and size of arguments, return values, etc. The pertaining dissimilarities in X and Y program units thus result from the different X and Y calling standards.

Call interfacing between dissimilar program units is provided by an automatic jacketing system 120 that includes automatic jacketing routines 122, commonly used by all routines that make external calls requiring jacketing. The automatic jacketing system 120 also includes structure built into loaded code images by a native Y compiler 124, a native Y linker 126, and an image activator 128. The process of image activation is designated by block 128A, whereas the image activator 128 itself is shown as resident in an area of memory 105 for the Y computer system.

Other pertinent programming resident in the memory 105 include support routine images 130, native Y images 101A, and translated code images 104A. An operating system 132 includes the image activator 128 and the jacketing routines 122.

Generally, in the process of building code for execution on a computer system having shared libraries or the like, the binding of calling and called procedures occurs at image activation time. Sharable images containing procedure libraries can thus be bound to callers at the beginning of execution thereby advantageously permitting such images to be replaced by newer versions without requiring the calling images to be rebuilt. The automatic jacketing system 120 is structured and operated in a manner that advantageously enables calling images to be replaced without rebuilding even though a replaced image may have had jacketing linkages.

Figure 1B:
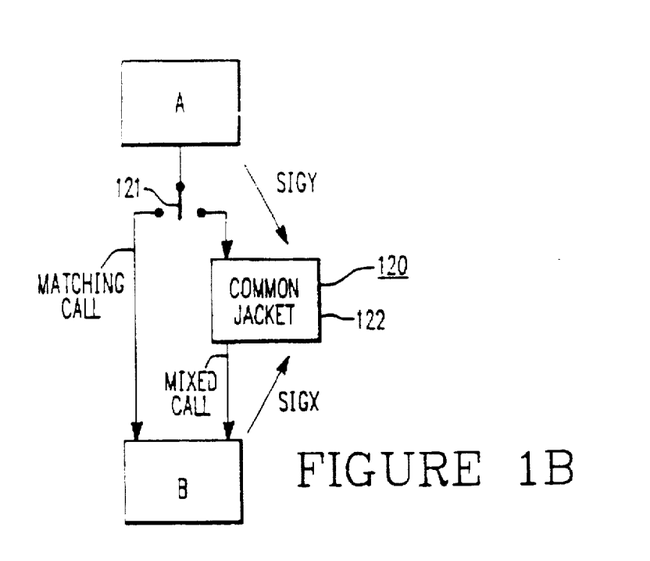
FIG. 1B shows a diagram of a model that provides an overview of the manner in which the automatic jacketing system operates.

In FIG. 1B, there is shown a general model of the automatic jacketing system 120 and the manner in which it operates. Thus, A program unit A may call a program unit B. If program units A and B have matched calling standards, the match is detected and switch 121 operates to provide a direct call connection from the program unit A to the program unit B.

If the program units A and B do not match, a mixed call is detected and a common jacketing routine 122 is invoked to control the connection. The jacketing routine 122 employs signature information SIGY and SIGX to provide the jacketing needed for the mixed call connection. Specifically, the signature information specifies the location and format of each argument and the jacketing routine 122 converts the arguments from the calling form to the callee form.

In the present embodiment, information about arguments is provided in the form of an argument list included with the translated code image 104. SIGY includes signature information generated by the compiler 124 for the native Y image 101 as subsequently described herein. Further, the common jacketing procedure is provided as two jacketing routines, one for handling native calls and the other for handling translated code calls.

JACKETING SYSTEM STRUCTURE PRODUCED AT COMPILE TIME

The Y compiler 124 builds structure as a part of the automatic jacketing system 220 (FIG. 1A) for facilitated jacketing by a common jacketing routine at run-time. Specifically, signature structures are built for subsequent processing and use.

Figure 2:
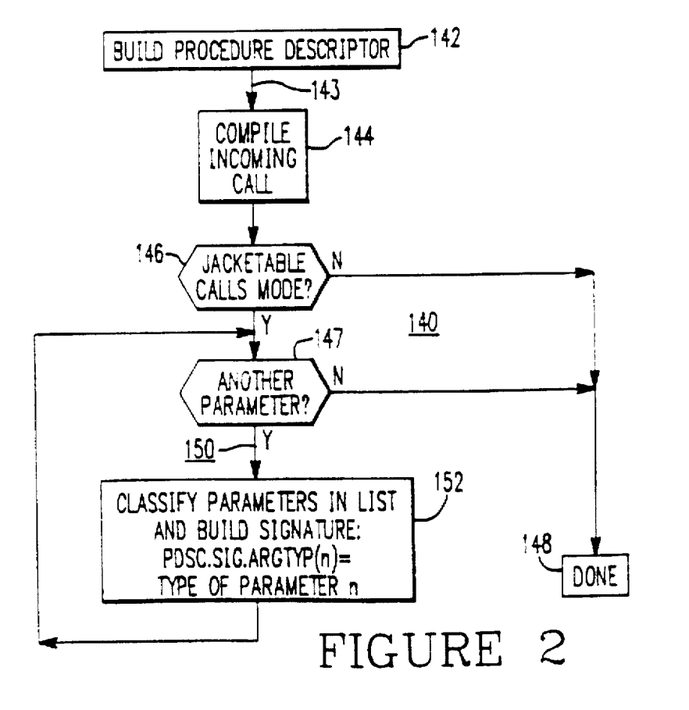
FIG. 2 shows a flow chart for a compiler routine for incoming procedure calls that builds a signature into a procedure descriptor that facilitates automatic jacketing at run-time.
Figure 9:
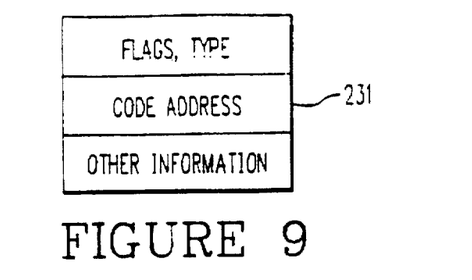
FIG. 9 shows a data structure for a procedure descriptor.

In FIG. 2, there is shown a compiler routine 140 employed by the Y compiler 124 during compilation of native Y code to build procedure descriptors (PD) for the various routines included in the Y code. The basic structure of a PD is shown in block 231 in FIG. 9.

A separate PD is normally created for each Y routine and is herein provided with additional structures to support automatic jacketing for interfacing dissimilar routines in accordance with the present invention. Thus, the PD routine 140 (FIG. 2) is entered in block 142, and various branches (not shown) are followed by the routine 140 to build conventional components of the PDs. Branch 143 is followed to block 144 to compile incoming calls, specifically to build respective incoming signatures for the respective routines in support of run-time jacketing.

Test block 146 first determines whether automatic jacketing has been selected by the user for the particular routine being processed by the PD routine 140. User selections are entered into the Y compiler 124 through block 125 (FIG. 1A).

If no selection has been made for automatic jacketing, the PD routine exits at block 148. If automatic jacketing is selected, loop 150 is entered to evaluate in block 152 all parameters in a parameter list included in the routine being processed by the PD routine 140.

The parameters are classified according to parameter type (i.e., floating point or integer type in the present invention embodiment) and processed one by one until test block 147 indicates that all listed parameters have been processed.

Generally, the parameter types that are distinguished are those that determine the location in which a parameter is passed and accordingly operate as data that facilitates the logical processing of arguments for parameters at run-time.

The classified parameter types and related information are built into an array that forms a signature in the PD for each incoming call in each Y code routine processed by the PD routine 140. Each signature generated by the PD routine 140 enables run-time jacketing code to connect incoming calls to the native Y code routine to which the signature applies.

The native Y code compiler 124 (FIG. 1A) also employs a routine 160 (FIG. 3) to build a bound procedure record (BPR) for each processed Y routine call. The BPRs are temporary records that may subsequently be used by the linker to support operation of the run-time jacketing code. Specifically, each BPR provides a signature for outbound calls to external target routines from the Y code routine to which it pertains.

Figure 3:
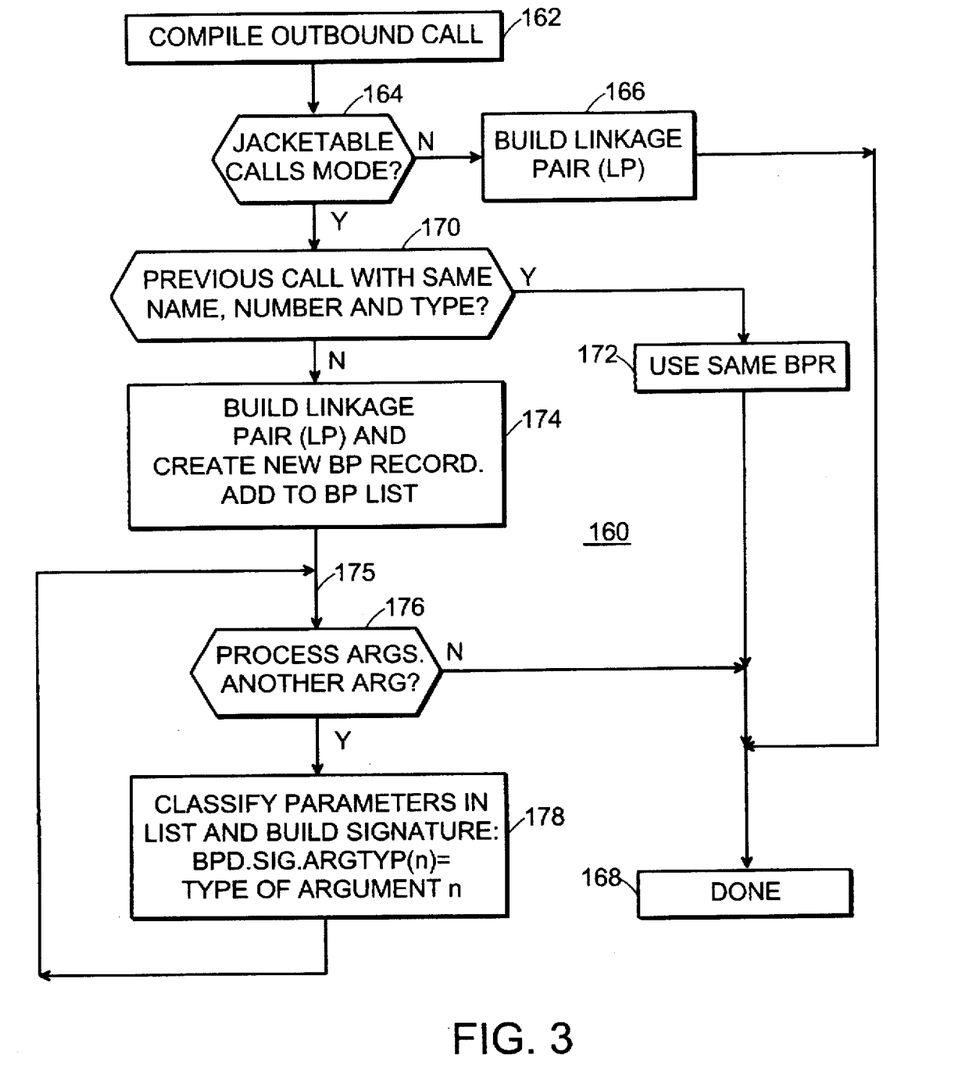
FIG. 3 shows a flow chart for a compiler routine for outgoing procedure calls that creates a bound procedure descriptor (BPD) record that facilitates automatic jacketing at run-time.

Block 162 provides entry to the BPR routine 160, and test block 164 next determines whether automatic jacketing has been selected by the user for an outgoing call to a known external routine. If the called external routine is known at compile time and automatic jacketing has not been selected, a direct connection can be specified at compile time and block 166 builds a linkage pair LP. The BPR routine 160 is then ended by block 168.

In the present invention embodiment, a linkage pair LP is represented by two quadwords: a procedure descriptor address and a code entry address. Generally, an LP is used, but is not required, to achieve faster call speed in cases where the called routine is known at compile time.

If automatic jacketing is selected, test block 170 determines whether an identical outbound call has been processed previously and, if so, block 172 assigns the BPR previously built for the same outbound call to the Y code routine currently being processed. If not, block 174 initiates creation of a new BPR and adds it to a bound procedure descriptor (BPD) list. Block 174 also creates an LP for call routines known at compile time.

A BPD enables calls using procedure variables to be made with additional context information as required by certain languages. The BPD also supports the context and switching requirements of automatic jacketing. Thus, a BPD includes the procedure descriptor for the target routine, a code address that can be modified to effect a switch, signature information and a code address for the target routine.

Figure 10:
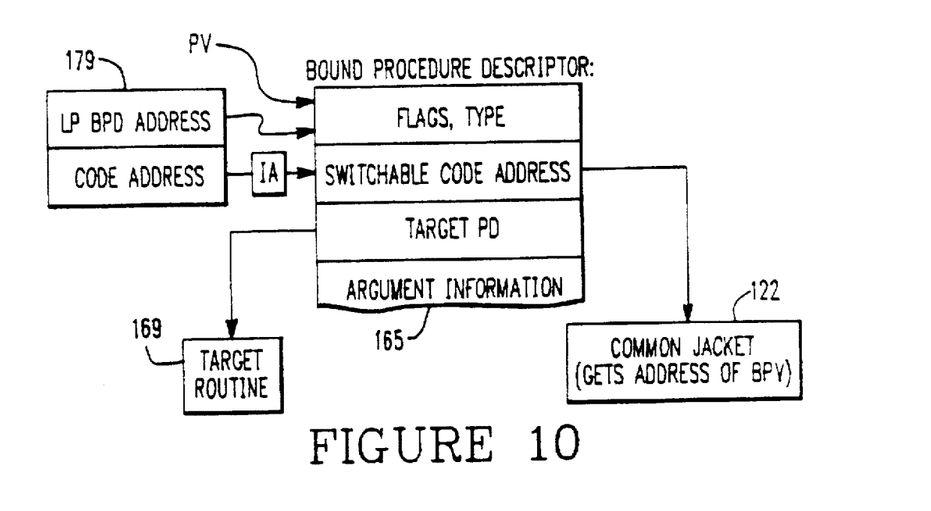
FIG. 10 illustrates fixups made by the image activator where it is determined that a jacket is needed.

To incorporate both switch support information and signature information, the BPD is structured as shown in FIG. 10. To optimize image space, the compiler 124 may specify signature information in an object record, and the Y linker then will build the BPD only if the call is to an external target.

Loop 175 is entered to process a call argument list provided with the Y code routine being processed. Block 178 classifies 20 the arguments according to type (i.e., floating point, 32-bit integer or 64-bit integer), and processes the arguments one by one until test block 176 indicates that all arguments on the argument list have processed and ends the BPR routine 160 at block 168.

The argument types and related information are built into an array that forms a signature for each outbound call in each Y code routine processed by the BPR routine 160. Similarly to the case of incoming calls, the signatures generated by the BPR routine 160 enable the run-time jacketing code to connect outgoing calls from the native Y code routines to translated code routines.

Since the signatures for the calling and called routines contain all of the information needed to convert arguments in the jacketing process, the jacketing can be provided by a common routine(s) that is driven by the two signatures.

JACKETING SYSTEM STRUCTURE PRODUCED AT LINK TIME

Linking combines a number of separately compiled modules into one image. A call may be external to the module but internal to the image, and the compiler is unable to determine whether a target external to the module is also external to the image. Accordingly, the linker resolves such calls.

The Y linker 126 resolves intra-image calls by direct transfer thereby avoiding any run-time checks or conversion overhead. For external calls, the Y linker 126 builds the signature information structured by the Y compiler 124 for later use.

Figure 4:
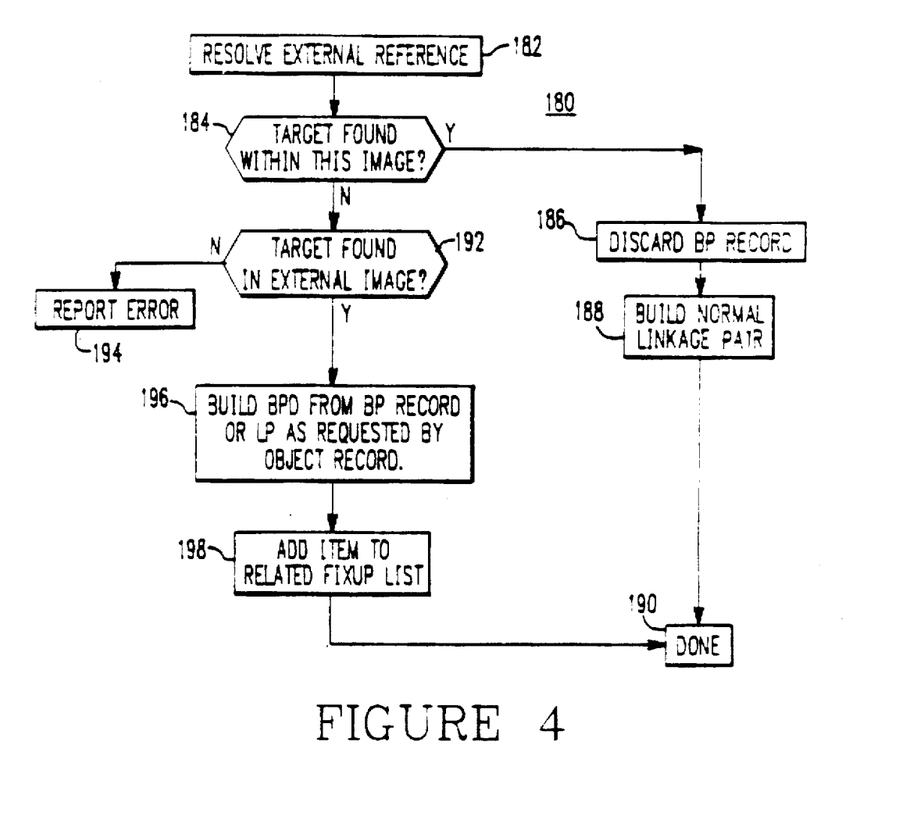
FIG. 4 shows a flow chart for a linker routine that resolves external references for the BPD record.

In FIG. 4, there is shown a linker routine 180 employed by the Y linker 126 to resolve external references for each outbound call to be jacketed in each processed Y code routine. The linker routine 180 is entered at block 182, and test block 184 determines whether the target routine for the outbound call being processed is within the Y image being processed. A symbol table built by the linker for routines within the image is searched by block 184 for the desired routine.

If the target routine is an internal one, block 186 discards the previously built BPR, a normal linkage pair is built by block 188, and the linkage routine is ended at block 190. Test block 192 next searches external images to determine whether the target routine is an external routine. If it is not, block 194 determines that the target routine does not exist and reports an error.

If the target routine is determined to be external, block 196 builds a bound procedure data structure BPD from each BPR and each LP built by the compiler 124. Generally, each BPD is formed by arranging BPD or LP information into a specified format. Each BPD thus includes a signature that will drive jacketing code for outgoing calls at run-time and is added to a fixup list by block 198 for subsequent processing by the image activator 128 (FIG. 1A).

JACKETING SYSTEM STRUCTURE PRODUCED AT IMAGE ACTIVATION TIME

The image activator 128 loads the native Y image(s) and translated image(s) into the memory for the Y processor 100 and makes image connections to provide executable code. Generally, the image activator 128 structures outgoing native calls with pointers to the run-time jacketing code thereby completing the structural component of the automatic jacketing system 120 (FIG. 1A) within the loaded native Y image(s).

In the present invention embodiment, native and translated images are in the same format for processing by the image activator. A translated image contains a flag in its header to identify it as such, and the image activator is accordingly enabled to recognize that calls from routines in this image are calls from translated routines.

Specifically, the translated image is an image produced from a translation of VAX® code. The translator 106 (FIG. 1A) finds and analyzes calls from VAX® images and produces translated code to handle the calls.

In the operation of the translator, the user is permitted to select whether autojacketing support is to be provided. If autojacketing is not selected, the translator determines whether each target is native or translated. For each call to a translated target, the translator builds a sequence that effects a direct transfer with no jacketing.

If autojacketing is selected, the translator makes no check of the type of target. Instead, each external call is provided with an entry mask (bit 12) check to determine the target type at run-time. If the run-time check indicates a native target, the call branches directly to the system autojacketing routine.

At the code point where a call is made, an argument list (a VAX® list in the present invention embodiment) constructed in memory and the target routine address are in hand for call handling. If the target routine is a translated code routine, as determined by a clear bit 12 in the routine entry mask, call control is provided within the translated image. If the target routine is in the native Y image, provision is made for control to be passed to the common jacketing routine 122.

The jacketing routine 122 expects the format of the arguments to be that which is specified by the call standard for the code (VAX® in the present invention embodiment) from which the translated routine has been translated.

Figure 5:
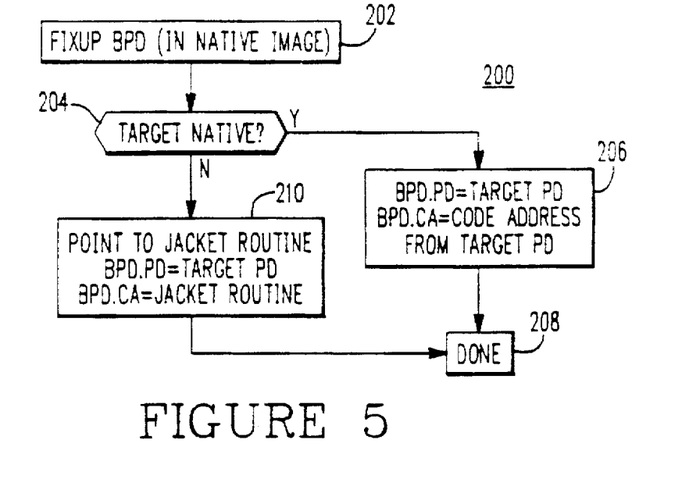
FIGS. 5 and 6 show flow charts for image activator fixup routines that create pointers from calling routines to targeted routines.

In FIG. 5, a BPD fixup routine 200 is entered at block 202 in the processing of each outgoing call. Test block 204 determines whether the target routine is native. If it is, block 206 creates a pointer that directly connects the calling and called routines and block 208 ends the routine 200.

If block 204 determines that the target routine is a translated-code routine, block 210 creates a pointer to a common jacket routine for native-to-translated code calls. As previously indicated, a branch to the jacketing routine 122 is created by the translator for each call that may need to be jacketed.

Figure 6:
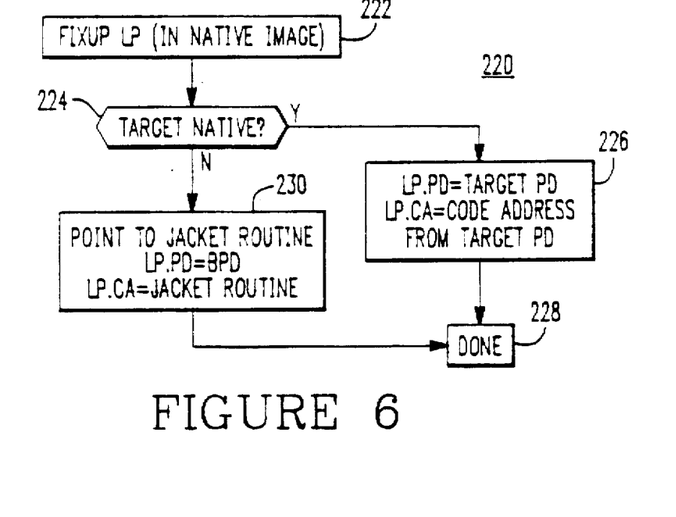

An LP fixup routine 220 is entered at block 222 for each outgoing call, and test block 224 determines where the target routine is located. If the target routine is located in the native image, block 226 creates a direct pointer between the calling and called routines. Block 228 then ends the LP fixup routine 220.

If the target routine is in the translated image, block 230 creates a pointer to the jacketing routine referenced in connection the block 210 in FIG. 5.

COMMON JACKET ROUTINES

In the present invention embodiment, explicit signatures are only present on the Y or native side of the translated code-native code interface. On the VAX® side, the VAX® argument list indicates the location or value of arguments but contains no information as to their type. The jacketing is accordingly driven entirely by the signatures from the native or Y side. In other applications of the invention, signatures may be present on both sides and the jacketing routine would use both caller and callee signatures to complete the reformatting.

Figure 7:
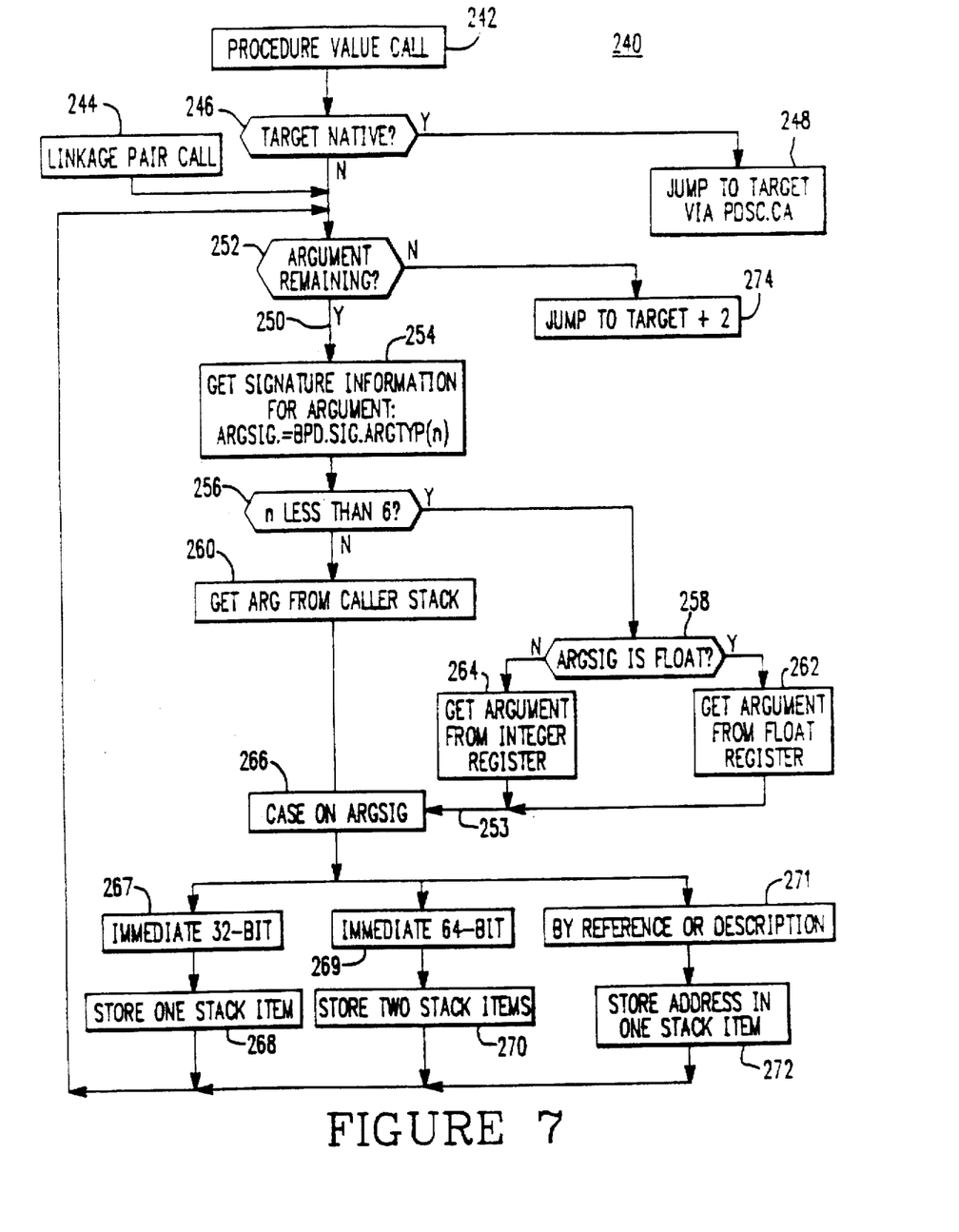
FIGS. 7 AND 8 show flow charts for jacket routines automatically executed at run-time in accordance with the present invention to provide jacketing, in the present embodiment, respectively for calls from a native-code routine and a translated-code routine.

In FIG. 7, there is shown a flow chart for one of the jacketing routines 122, i.e., a common jacketing routine 240 provided as a part of the automatic jacketing system 220 (FIG. 1A) to jacket calls from a first program unit to a second dissimilar program unit, i.e., a native code caller to a translated code caller in the present embodiment. The jacketing routine 240 is entered through block 242 in path 241 with the target routine address given if the call is a computed call, i.e., a procedure value call. If the call is a linkage pair (LP) call, the jacketing routine 240 is entered through block 244 with the target BPD address given.

The following call sequence is provided for a procedure value call:

| | | |
|---|---|---|
| LDQ RA, | PD_CODE_ADDR(R4) | ; load code addr of target |
| MOVE R4, | PV | ; load proc descr of target |
| JSR RA, | (RA) | ; jump to target, save PC |

The following call sequence is provided for a linkage pair call:

| | | | |
|---|---|---|---|
| 1 | | | |
| | LDQ RA, | LP_CODE_ADDR(R4) | ; load code addr of target |
| | LDQ PV, | LP_DESC_ADDR(R4) | ; load proc descr of target |
| | JSR RA, | (RA) | ; jump to target, save PC |

With reference again to the jacketing routine 240, test block 246 determines whether the target routine is located in the native Y image and, if so, block 248 jumps to the target routine. If the procedure value call is detected to be to the translated image or if an LP call has been entered through the block 244, an information transfer loop 250 is entered through test block 252.

To enable switching to occur between matched and mismatched calls in the present embodiment, the test block 246 makes reference to bit 12 of an entry mask for the target routine. If bit 12 is clear, the target routine is known to be a translated code routine. If bit 12 is set, the target routine is known to be a native Y routine.

The call signature information that is based upon the call standard for the calling program unit, i.e., the call standard for the native image in the present embodiment is acquired for the target routine arguments by the block 245. In the loop 250, the signature information is processed for transfer to the target routine in accordance with the call standard for the second and dissimilar program unit, i.e., the call standard for the translated image in the present embodiment.

Generally, in the loop 250, the state location of signature information is determined and then processed to state argument by argument in accordance with the call standard for the target routine. In the present embodiment, test blocks 256 and 258 determine where the signature information is, i.e., on the stack or in a register.

In the present invention embodiment, i.e., in the call standard for the RISC architecture, the first six arguments are passed in registers. Each of the first six arguments is in a fixed or floating point register appropriate to the argument type.

Accordingly, block 260 gets the argument from the stack if the variable "n" is greater than six. On the other hand, the test block tests for a float argument and block 262 obtains float arguments from a float register or block 264 obtains integer arguments from an integer register.

Stack arguments obtained in branch 251 or register arguments obtained in branch 253 are passed to block 266 which determines in accordance with the call standard of the translated image, i.e., the VAX® standard in the present embodiment, the performance case that applies to each processed argument.

In the specific VAX® environment, all arguments are stored on the stack. Thus, block 268 stores each immediate 32-bit type of argument as one stack item, and block 270 stores each immediate 64-bit type of argument as two stack items. For arguments identified by reference or descriptor, block 172 stores the address of each passed data item in one stack item.

As previously indicated, the loop 250 continues execution, argument by argument, until no arguments remain. At that time block 274 ends the jacketing routine 240 and jumps to the target routine.

Figure 8:
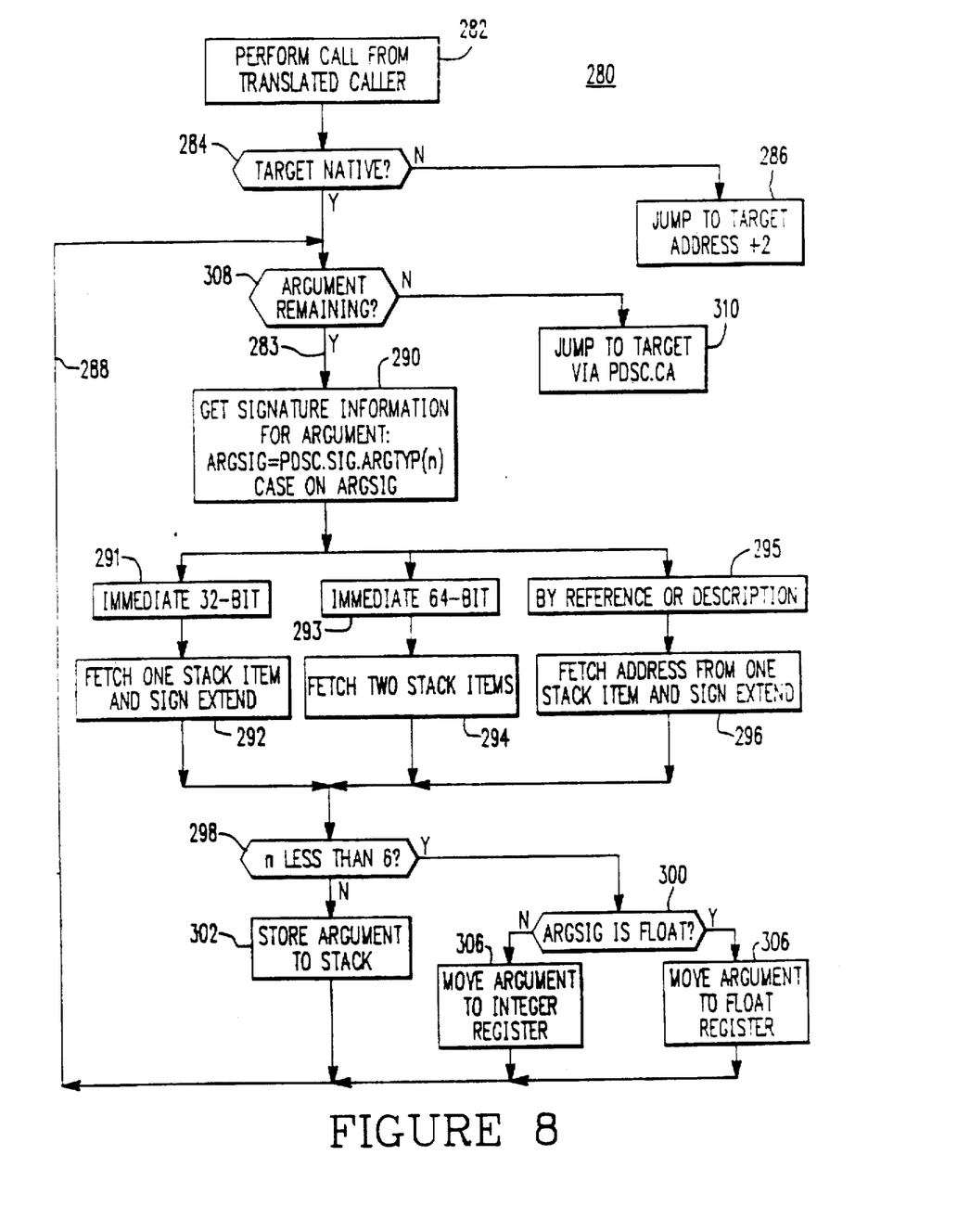

A common jacketing routine 280 shown in FIG. 8 is also one of the jacketing routines 122 in the automatic jacketing system 120. It provides jacketing for calls from the second program unit to the dissimilar first program unit, i.e., from the translated image to the native image in the present embodiment.

Generally, the translated-to-native jacketing routine 280 follows a process that is inverse to the process followed by the native-to-translated jacketing routine 240.

Accordingly, a call from the translated image is entered by block 282 with the address of the target routine and an argument list from the translated code, i.e., a VAX® argument list in the present embodiment. If the call is to the translated image, test block 284 causes block 286 to end the routine and jump to the target routine. Otherwise, loop 288 is entered to process signature information for a call to the native image.

Block 290 obtains information from the stack according to the parameter type. Thus, either one stack item is fetched by block 292 for the direct 32-bit case 291, two stack items are fetched 294 for the direct 64-bit case 293 or an address is fetched 296 from one stack item for the indirect case 295 by reference or descriptor.

Next, test blocks 298 and 300 direct the storage of arguments in accordance with the native image calling standards or conventions. If the argument is numbered six or greater on the argument list, the argument is stored to stack by block 302. If the argument is less than number six on the argument list and it is a float argument, block 304 stores the argument to a float register 304. If the argument is less than number six on the argument list and it is an integer argument, block 306 stores the argument in an integer register.

The loop 288 continues to execute until all arguments on the argument list are processed. At that time, test block 308 causes the jacketing routine 280 to end and block 310 jumps to the target native Y routine with call information supplied as expected by that routine in accordance with the native Y calling standards or conventions.

With respect to returns, the jacketing sets up the return address register so that control is passed back to the jacket when the procedure exits. A single value is adjusted like the arguments are adjusted on entry. The signature contains a single item in which the type of the return value is encoded. A floating value is moved to or from the floating registers and a 64-bit integer is formatted to move to or from two 32-bit registers.

Thus, on return, the jacketing routine 122 adjusts the return value, cleans up the stack of the callee by removing anything that the jacket put on at entry and returns to the original caller.

OVERVIEW

There is shown in FIG. 10 a block diagram of the system setup when there is mismatch between the caller and the callee, i.e., where common jacketing is required and BPD and LP fixups are needed. In this case, the second field of BPD 165 is set by the image activator 128 to point to the common jacketing routine 122.

The address of the BPD 165 is delivered to the common jacketing routine 122, and the jacketing routine can thereby find the signature for the calling procedure. By reference to the target PD, the jacketing routine can find the signature for the target routine 169.

After argument conversion is performed, execution control is transferred to the target routine. A return to the jacketing code 122 is provided in a return address register to effect cleanup.

In the case of a linkage pair 179, the second field contains the switchable target address which is copied from the BPD to effect binding at image activation time as indicated by block IA.

Figure 11:
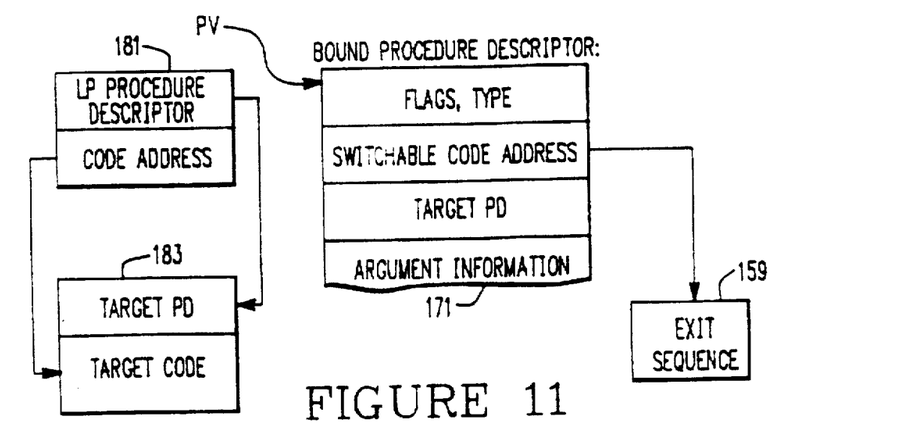
FIG. 11 illustrates fixups made by the image activator where it is determined that no jacket is needed.

In FIG. 11, the basic system structure shown in FIG. 10 is shown switched (by the image activator 128) to the match case, i.e., where no jacketing is required since the caller and the callee have been determined to match at image activation time. For procedure value calls, the second field of BPD 171 points to a sequence that establishes the target PD and transfers control to the target without use of the signature information.

For calls that are specified by name at compile time and thus do not use a procedure value, a linkage pair 181 is fixed up to point directly to the target 183 without any additional overhead.

Figure 12:
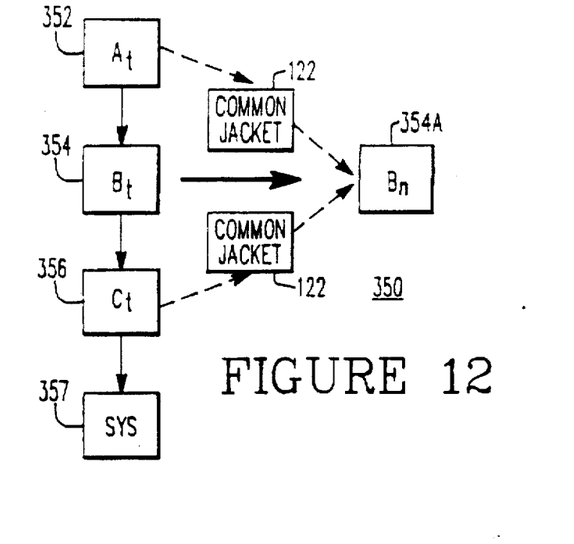
FIG. 12 illustrates the facilitated manner in which an image can be replaced by a later version after the image had been jacketed for operation within a system of operating programs.

The manner in which the present invention provides automatic jacketing for dissimilar program units yet facilitates replacement of an image by a subsequent version of the same image is illustrated in FIG. 12. Thus, an initial program system 350 may include three translated images 352, 354 and 356 and a system image 357.

Later, a new version 354A written in native Y code is developed to replace the translated image 354, and substitution is achieved simply by image activation with the existing images 352 and 356 to which it is to be connected. No recompiling or relinking is required to complete the substitution.

As a result of reactivation of images, the image 354A is call connected, as indicated by dotted lines, to the images 352 and 356 by the common jacketing routines 122.

Figure 13:
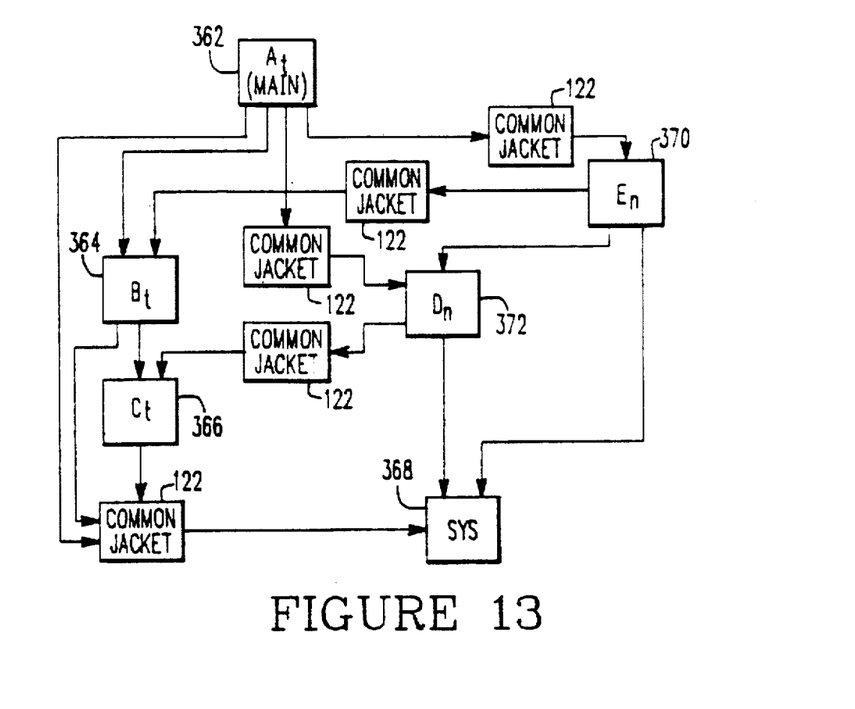
FIG. 13 provides an illustrative example of an arbitrary mixture of dissimilar images, or native and translated images in this embodiment, interfaced with jacketing to function as an integrated program system in accordance with the present invention.

In FIG. 13, there is illustrated a programming system 360 with a more complex set of program images with jacketing provided as required for inter-image calls. Thus, four translated code images 362, 364, 366, and 368 and two native images 370 and 372 are provided. Common jacketing routines 122 provide for call connections among the various images as shown.

Various modifications and variations can be made in the system and method for automatically interfacing call conventions between two dissimilar program units of the present invention by those skilled in the pertaining art without departing from the scope and spirit of the invention. It is accordingly intended that the present invention embrace such modifications and variations to the extent they come within the scope of the appended claims and their equivalents.

What is claimed is:

1. A jacketing system for use on a computer system having a computer memory and a plurality of dissimilar computer program units stored in the computer memory, each of said plurality of computer program units having a specific calling standard, the jacketing system comprising:

means for detecting during linking of a first computer program unit an interimage call from said first computer program unit in said computer memory to a second program unit in said computer memory;

means, coupled to the interimage call detecting means, for determining at image activation prior to runtime whether the calling standards of said first computer program unit and said second computer program unit match;

means, used during image activation prior to runtime and coupled to the calling standard match determining means, for providing for a transfer of control during program execution from said first computer program unit to said second computer program unit without jacketing if a calling standard match is determined; and means, used during image activation time prior to runtime and coupled to the calling standard match determining means, for providing runtime jacketing of said interimage call and for transferring control from said first computer program unit to said second computer program unit if the calling standards of the first and second computer program units do not match.

2. The jacketing system of claim 1 wherein said runtime jacketing includes means for converting parameters to be passed from said first computer program unit to said second computer program unit to a representation that uses the calling standard of said second computer program unit.

3. The jacketing system of claim 2 wherein said converting means includes a structure contained in said first computer program unit describing parameters for incoming calls and arguments for outgoing calls, said interimage call being one of said outgoing calls.

4. The jacketing system of claim 3 wherein said structure includes a first signature describing parameters of incoming calls and a second signature for each outgoing call describing arguments of each outgoing call, respectively.

5. The jacketing system of claim 4, wherein said first computer program unit is a native program unit to said computer system, said first and second signatures are contained in said first computer program unit, and wherein said second computer program unit is a translated program unit.

6. The jacketing system of claim 3 wherein said converting means further includes means for coupling said first computer program unit and said second computer program unit to complete said interimage call.

7. The jacketing system of claim 6 wherein said coupling means utilizes information from said structure to convert and transmit arguments in the interimage call from said first computer program unit to said second computer program unit.

8. The jacketing system of claim 4 wherein said converting means further includes means for coupling said first computer program unit and said second computer program unit to complete said interimage call.

9. The jacketing system of claim 8 wherein said coupling means utilizes information from said signatures to convert and transmit arguments in the interimage call from said first computer program unit to said second computer program unit.

10. A jacketing system for use on a computer system having a computer memory and having a plurality of dissimilar program units stored in the computer memory, each of said plurality of computer program units having a specific calling standard and being capable of executing on said computer system, the jacketing system comprising:

a first computer program unit having a first calling standard;

a second computer program unit having a second calling standard;

means for defining incoming calls and outgoing calls for each computer program unit in accordance with the calling standard of that computer program unit;

means for detecting during linking of said first computer program unit interimage calls from said first computer program unit to said second computer program unit on said computer system, said outgoing calls including said interimage calls;

means, used during image activation prior to runtime and coupled to the interimage call detecting means, for determining whether the calling standards of said first computer program unit and said second computer program unit match; and means, coupled to said determining means, for jacketing a portion of said interimage calls for which said determining means has determined that the calling standards of said first and said second computer program units do not match, said jacketing means including means for processing and transmitting arguments for each of said portion of interimage calls in accordance with said defining means.

11. The jacketing system of claim 10 wherein said defining means includes means for describing parameters for incoming calls and arguments for outgoing calls.

12. The jacketing system of claim 11 wherein said defining means includes a procedure descriptor for each of said first computer program units and wherein said procedure descriptor includes a signature describing said parameters for incoming calls.

13. The jacketing system of claim 12 wherein said defining means further includes a bound procedure descriptor for each outgoing call from said first computer program unit and wherein each of said bound procedure descriptors includes a procedure descriptor and a signature describing said arguments for said call to said second computer program unit.

14. The jacketing system of claim 11 wherein means are provided for processing calls between said first computer program unit and second computer program unit in accordance with said defining means.

15. The jacketing system of claim 13 wherein means are provided for processing calls between said first computer program unit and said second computer program unit in accordance with said procedure descriptors and said bound procedure descriptors.

16. The jacketing system of claim 12 wherein means are provided for creating said procedure descriptors during compilation of said first computer program unit and said second computer program unit.

17. The jacketing system of claim 13 wherein means are provided for creating said procedure descriptors during compilation of said first computer program unit and said second computer program unit.

18. A jacketing method for use on a computer system having a computer memory for interfacing a plurality of dissimilar computer program units stored in the computer memory, each of the plurality of computer program units having a specific calling standard, the method comprising the steps of:

detecting during linking of a first computer program unit a call from said first computer program unit to a second computer program unit on said computer system;

determining at image activation whether the calling standards of said first computer program unit and said second computer program unit match;

providing at image activation for a transfer of control during program execution from said first computer program unit to said second computer program unit without jacketing said call if a calling standard match is determined; and providing at image activation for runtime jacketing of said call, and for transferring control during program execution from said first computer program unit to said second computer program unit if the calling standards of the first and second computer program units do not match.

19. The jacketing method of claim 18 wherein said jacketing includes converting arguments to be passed form said first computer program unit to said second computer program unit to a representation that uses the calling standard of said second computer program unit.

20. The jacketing method of claim 19 wherein said converting substep includes inserting a structure in at least one of said computer program units describing parameters for incoming calls according to type, and arguments for outgoing calls according to location and format.

21. The jacketing method of claim 20 wherein the step of inserting said structure includes the substep of inserting a first signature describing parameters for incoming calls and a second signature for each outgoing call describing arguments of each outgoing call, respectively.

22. The jacketing method of claim 20 wherein said converting substep further includes coupling said first computer program unit and said second computer program unit to complete said call.

23. The jacketing method of claim 22 wherein said coupling substep includes the substep of using said inserted structure to convert and transmit arguments in the call from said first computer program unit to said second computer program unit.

24. A jacketing method for use on a computer system with a memory for interfacing a plurality of computer program units comprising the steps of:

storing a first computer program unit having a first calling standard in said memory;

storing a second computer program unit having a second calling standard in said memory;

defining incoming and outgoing calls for each computer program unit in accordance with the calling standard of that computer program unit;

detecting calls including a first interimage call from said first computer program unit to said second computer program unit on said computer system;

detecting calls including a second interimage call from the second computer program unit to said first computer program unit on the computer system;

determining at image activation for said first and said second interimage calls whether the calling standards of said first computer program unit and said second computer program unit match; and jacketing, in response to said determining step, a portion of said interimage calls for which the calling standards of said first and said second computer program units do not match, said jacketing step including processing and transmitting arguments for each of said portion of interimage calls in accordance with said defining step.

25. The jacketing method of claim 24 wherein said defining step includes describing parameters for each incoming call and arguments for each outgoing call in each computer program unit.

26. The jacketing method of claim 25 wherein said defining step includes defining a procedure descriptor for each of said first computer program units and wherein said procedure descriptor includes a signature describing said parameters for incoming calls.

27. The jacketing method of claim 26 wherein said defining step further includes defining a bound procedure descriptor for each outgoing call from each of said first computer program units and wherein each of said bound procedure descriptors includes a procedure descriptor and a signature describing said arguments for the outgoing call.

28. An automated method of runtime jacketing for use on a computer system with a memory and a plurality of program units stored in the memory, each of said plurality of program units having a calling standard, the method comprising the steps of:

compiling a first program unit having a first calling standard with a compiler to produce a first object file, said first object file including a bound procedure record for an outbound call from said first program unit to a second program unit with a second calling standard;

linking said first program unit with a linker to produce a machine executable, said linking including detecting outbound calls from said first program unit, and determining whether any of said outbound calls is an interimage outbound call, said machine executable containing a bound procedure descriptor produced by said linker using information from said bound procedure record for each interimage outbound call; and activating said machine executable with an image activator, prior to runtime, said activating including determining for each interimage outbound call whether the calling standards of said first program unit and said second program unit match, providing for a transfer of control during program execution without jacketing if a calling standard match is determined, and providing for runtime jacketing of said interimage outbound call and transfer of control from said first program unit to said second program unit if the calling standards of the first and second program units do not match.

\* \* \* \* \*